(12) United States Patent
Kim et al.

(10) Patent No.: US 10,129,852 B2
(45) Date of Patent: Nov. 13, 2018

(54) METHOD FOR BROADCASTING TO UNSPECIFIED ENTITY IN WIRELESS COMMUNICATION SYSTEM AND DEVICE FOR THE SAME

(71) Applicant: LG ELECTRONICS INC., Seoul (KR)

(72) Inventors: Dongjoo Kim, Seoul (KR); Byungjoo Lee, Seoul (KR); Jeonghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 15/414,917

(22) Filed: Jan. 25, 2017

(65) Prior Publication Data

US 2017/0353944 A1 Dec. 7, 2017

Related U.S. Application Data

(60) Provisional application No. 62/344,378, filed on Jun. 1, 2016.

(51) Int. Cl.
*H04W 72/00* (2009.01)
*H04W 68/00* (2009.01)
*H04W 4/70* (2018.01)

(52) U.S. Cl.
CPC ....... *H04W 72/005* (2013.01); *H04W 68/005* (2013.01); *H04W 4/70* (2018.02)

(58) Field of Classification Search
CPC . H04W 4/005; H04W 68/005; H04W 72/005; H04W 4/70; H04W 4/06; H04W 4/46
See application file for complete search history.

(56) References Cited

U.S. PATENT DOCUMENTS

| | | | | |
|---|---|---|---|---|
| 9,332,549 B2* | 5/2016 | Lu | ........................... | H04W 4/70 |
| 9,491,567 B2* | 11/2016 | Koo | ...................... | H04W 4/005 |
| 9,801,049 B2* | 10/2017 | Koo | ...................... | H04W 8/245 |
| 9,838,258 B2* | 12/2017 | Wang | ...................... | H04W 4/70 |
| 9,883,320 B2* | 1/2018 | Kim | ........................ | H04W 4/70 |
| 9,883,400 B2* | 1/2018 | Jeong | ..................... | H04W 4/70 |
| 9,936,029 B2* | 4/2018 | Yin | ........................ | H04L 67/16 |
| 2010/0002582 A1* | 1/2010 | Luft | .................. | H04W 74/0833 |
| | | | | 370/230.1 |
| 2012/0302229 A1* | 11/2012 | Ronneke | ........... | H04L 29/12754 |
| | | | | 455/422.1 |

(Continued)

*Primary Examiner* — Devan Sandiford
(74) *Attorney, Agent, or Firm* — Birch, Stewart, Kolasch & Birch, LLP

(57) ABSTRACT

Provided is a method for transferring a broadcast message to an unspecified entity in a wireless communication system, the method performed by a device for transferring a broadcast message and comprising creating a resource for receiving the broadcast message in accordance with a request, received from an application device, for creating the resource for receiving the broadcast message, storing a content of the broadcast message in a specified attribute of the created resource if the broadcast message is received, and if an event trigger condition of a subscription resource for the created resource is satisfied, transmitting a notification message, which includes the stored content of the broadcast message, to an address or a device indicated by a notification target attribute of the subscription resource.

10 Claims, 11 Drawing Sheets

(56) References Cited

U.S. PATENT DOCUMENTS

| | | | | |
|---|---|---|---|---|
| 2013/0219064 A1* | 8/2013 | Zhang | ............... | H04W 4/00 |
| | | | | 709/225 |
| 2013/0336222 A1* | 12/2013 | Lu | ............... | H04W 4/70 |
| | | | | 370/328 |
| 2014/0126581 A1* | 5/2014 | Wang | ............... | H04W 4/70 |
| | | | | 370/431 |
| 2014/0233473 A1* | 8/2014 | Lu | ............... | H04W 4/70 |
| | | | | 370/329 |
| 2014/0256285 A1* | 9/2014 | Koo | ............... | H04W 4/005 |
| | | | | 455/406 |
| 2016/0212732 A1* | 7/2016 | Choi | ............... | H04W 4/70 |
| 2017/0201392 A1* | 7/2017 | Ahn | ............... | H04W 4/70 |
| 2017/0215026 A1* | 7/2017 | Kim | ............... | H04W 4/70 |
| 2017/0238279 A1* | 8/2017 | Jeong | ............... | H04W 4/70 |
| | | | | 455/458 |
| 2017/0257726 A1* | 9/2017 | Jeong | ............... | H04W 4/70 |
| 2017/0303227 A1* | 10/2017 | Choi | ............... | H04W 4/70 |
| 2017/0311303 A1* | 10/2017 | Ahn | ............... | H04W 4/70 |
| 2018/0034777 A1* | 2/2018 | Jeong | ............... | H04W 4/70 |
| 2018/0109929 A1* | 4/2018 | Ly | ............... | H04W 4/06 |
| 2018/0146497 A1* | 5/2018 | Jeong | ............... | H04W 74/06 |

\* cited by examiner

METHOD FOR BROADCASTING TO UNSPECIFIED ENTITY IN WIRELESS COMMUNICATION SYSTEM AND DEVICE FOR THE SAME

CROSS-REFERENCE TO RELATED APPLICATIONS

Pursuant to 35 U.S.C. § 119(a), this application claims the benefit of earlier filing date and right of priority to U.S. Provisional application No. 62/344,378, filed on Jun. 1, 2016, the contents of which are hereby incorporated by reference herein in their entirety.

BACKGROUND OF THE INVENTION

Field of the Invention

The present invention relates to a method for broadcasting to an unregistered entity in a wireless communication system and a device for the same.

Discussion of the Related Art

In an Internet of things (IoT) communication environment, a scenario, in which an application of a specific system simultaneously transmits event data to a plurality of unspecified receivers within a limited time and the unspecified receivers perform required handling by receiving the event data, may exist.

As a main example, a scenario for transmitting and receiving safety related data between vehicles, which are moving at high speed, may be considered.

For example, if a moving vehicle (a source vehicle) is suddenly stopping to avoid an obstacle, vehicle event information (location, speed, direction, brake state, . . . ) is broadcasted to neighboring vehicles. Only vehicles (which are located on the same lane as the source vehicle and located at the rear of the source vehicle) to which potential risk occurs, among the neighboring vehicles, receive broadcasted information selectively and transfer a warning message to drivers of the corresponding vehicles.

The legacy oneM2M system has problems difficult to support the above scenario for the following reasons that will be described.

A problem that data can be transmitted to only an entity previously registered through a pre-registration procedure and a transmission delay problem For communication between devices through the legacy oneM2M system, a registration procedure described in FIG. 8 accompanied with this specification should be preceded.

CSE registration is necessarily required for connection between service platforms, and AE registration is necessarily required for specific application. That is, for communication between two entities, one of the two entities should serve as a server to register the other entity or both of the two entities should previously be registered in a common cloud server to enable mutual data transmission and reception. Therefore, there is no method for transmitting data to an entity which is not previously registered as far as the entity does not know a specific uniform resource identifier (URI).

Also, for communication between devices which are moving, a dynamic registration procedure is required. This causes data transmission delay in case of time restrictive data sharing.

Impossible transmission to a plurality of unspecified entities by means of a processing scheme based on subscription/notification In the oneM2M system, a subscription/notification scheme, which will be described in FIGS. 9 and 10, should be used for event data sharing. According to the legacy subscription/notification scheme, if subscription resources are generated in interested resources, only a target entity previously expressed in notificationURI attribute may receive notification information when a specified event occurs.

This means that there is no method for transferring random data from an original resource hosting entity to a plurality of unspecified entities.

SUMMARY OF THE INVENTION

Accordingly, the present invention is directed to a method for broadcasting to an unregistered entity in a wireless communication system and a device for the same, which substantially obviate one or more problems due to limitations and disadvantages of the related art.

An object of the present invention is to provide a method for transmitting a broadcast message from a transmitting or transferring entity, device, etc. to an unregistered unspecified entity, device, etc.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

In an aspect of the present invention, provided herein is a method for transferring a broadcast message to an unspecified entity in a wireless communication system, performed by a device for transferring a broadcast message. The method may include creating a resource for receiving the broadcast message in accordance with a request, received from an application device, for creating the resource for receiving the broadcast message, storing a content of the broadcast message in a specified attribute of the created resource if the broadcast message is received, and if an event trigger condition of a subscription resource for the created resource is satisfied, transmitting a notification message, which includes the stored content of the broadcast message, to an address or a device indicated by a notification target attribute of the subscription resource.

Additionally or alternatively, the method may further include receiving a request for creating the subscription resource for the created resource from the application device; and creating the subscription resource in accordance with the request.

Additionally or alternatively, the broadcast message may include information indicating a receiver of the broadcast message which is set as a predetermined keyword.

Additionally or alternatively, the created resource may include a first attribute for storing the content of the received broadcast message and a second attribute for storing information on a network protocol through which the broadcast message is received.

Additionally or alternatively, the method may further include deleting the stored content of the broadcast message if the notification message is transferred.

In another aspect of the present invention, provided is a method for transferring a broadcast message to an unspecified entity in a wireless communication system, the method performed by a device for transferring a broadcast message, may include creating a resource for transmitting the broadcast message in accordance with a request, received from an application device, for creating the resource for transmitting the broadcast message; creating a subscription resource for the created resource in accordance with a request, received from the application device, for creating the subscription resource; and if an event trigger condition of the subscription resource for the created resource is satisfied, transmitting the broadcast message including information related to the event.

Additionally or alternatively, the broadcast message may include information indicating a receiver of the broadcast message which is set as a predetermined keyword.

Additionally or alternatively, the created resource for transmitting the broadcast message may include a first attribute for storing information of a transmission cycle or transmission end timing of the broadcast message and a second attribute for storing information on a network protocol through which the broadcast message is transmitted.

Additionally or alternatively, the broadcast message may be transmitted in accordance with the information stored in the first attribute.

Additionally or alternatively, a notification target attribute of the subscription resource may be set to a predetermined keyword.

In still another aspect of the present invention, a device configured to transfer a broadcast message to an unspecified entity in a wireless communication system, may include a transmitter; a receiver; and a processor configured to control the transmitter and the receiver, wherein the processor is configured to: create a resource for receiving the broadcast message in accordance with a request, received from an application device, for creating the resource for receiving the broadcast message received from an application device, store a content of the broadcast message in a specified attribute of the created resource if the broadcast message is received, and if an event trigger condition of a subscription resource for the created resource is satisfied, transmit a notification message, which includes the stored content of the broadcast message, to an address or a device indicated by a notification target attribute of the subscription resource.

Additionally or alternatively, the processor may be configured to receive a request for creating the subscription resource for the created resource from the application device and create the subscription resource in accordance with the request.

Additionally or alternatively, the broadcast message may include information indicating a receiver of the broadcast message which is set as a predetermined keyword.

Additionally or alternatively, the created resource may include a first attribute for storing the content of the received broadcast message and a second attribute for storing information on a network protocol through which the broadcast message is received.

Additionally or alternatively, the processor may be configured to delete the stored content of the broadcast message if the notification message is transferred.

In further still another aspect of the present invention, a device configured to transmit a broadcast message to an unspecified entity in a wireless communication system, may include a transmitter; a receiver; and a processor configured to control the transmitter and the receiver, wherein the processor may be configured to: create a resource for transmitting the broadcast message in accordance with a request, received from an application device, for creating the resource for transmitting the broadcast message, create a subscription resource for the created resource in accordance with a request, received from the application device, for creating the subscription resource, and if an event trigger condition of the subscription resource for the created resource is satisfied, transmit the broadcast message including information related to the event.

Additionally or alternatively, the broadcast message may include information indicating a receiver of the broadcast message which is set as a predetermined keyword.

Additionally or alternatively, the created resource for transmitting the broadcast message may include a first attribute for storing information of a transmission cycle or transmission end timing of the broadcast message and a second attribute for storing information on a network protocol through which the broadcast message is received.

Additionally or alternatively, the broadcast message may be transmitted in accordance with the information stored in the first attribute.

Additionally or alternatively, a notification target attribute of the subscription resource may be set to a predetermined keyword.

The above technical solutions are merely some parts of the embodiments of the present invention and various embodiments into which the technical features of the present invention are incorporated can be derived and understood by persons skilled in the art from the following detailed description of the present invention.

According to one embodiment of the present invention, the broadcast message may be transmitted or transferred to an unspecified entity, device, etc. For this reason, warning, alarm services, etc. may be performed more variously.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
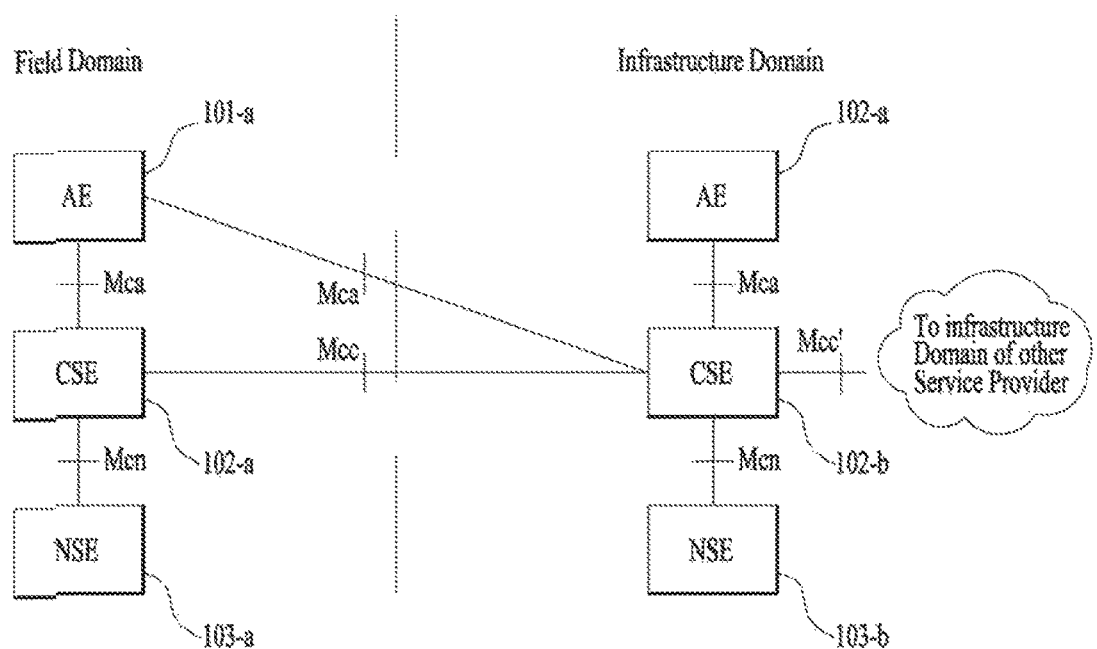
FIG. 1 illustrates a function structure in an M2M communication system.

FIG. 1 illustrates the architecture of an M2M communication system. Each entity will now be described.

Application entity (AE, 101): Application entity provides application logic for end-to-end M2M solutions. Examples of the application entity include fleet tracking application, remote blood sugar monitoring application, remote power metering and controlling application.

Common service entity (CSE, 102): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
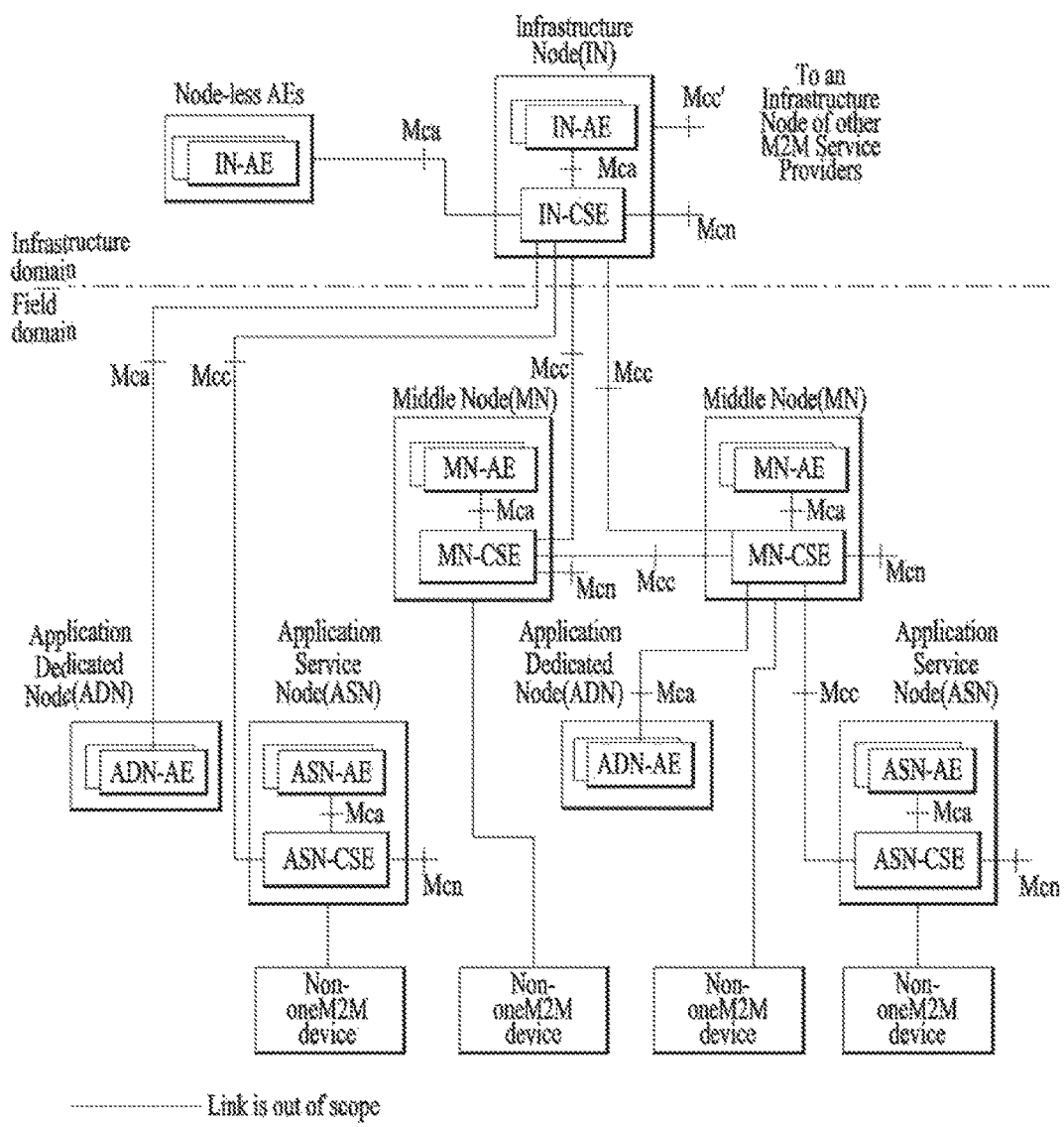
FIG. 2 illustrates a configuration supported by an M2M communication system based on an M2M function structure.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least one M2M application and does not contain a CSE. The ADN can communicate over an Mca reference point with one middle node or one infrastructure node. The ADN can be present in an M2M device.

Application Service Node (ASN): An application service node is a node that contains at least one CSE and has at least one M2M application. The ASN can communicate over a Mcc reference point with one middle node or one infrastructure node. The ASN can be present in an M2M device.

Middle Node (MN): A middle node is a node that contains at least one CSE and may contain M2M applications. The middle node communicates over a Mcc references point with at least two nodes belonging to the following different category:
  one or more ASNs;
  one or more middle nodes (MNs); and
  one infrastructure structure.

The MN can be connected with the ADN through an Mca reference point. The MN can be present in an M2M gateway.

Infrastructure Node (IN): An infrastructure node is a node that contains one CSE and may contain application entities (AEs). The IN can be present in M2M server.

The IN communicates over a Mcc reference point with either:
  one or more middle nodes; and/or
  one or more application service nodes.

The IN may communicate with one or more ADNs over one or more Mca reference points.

Figure 3:
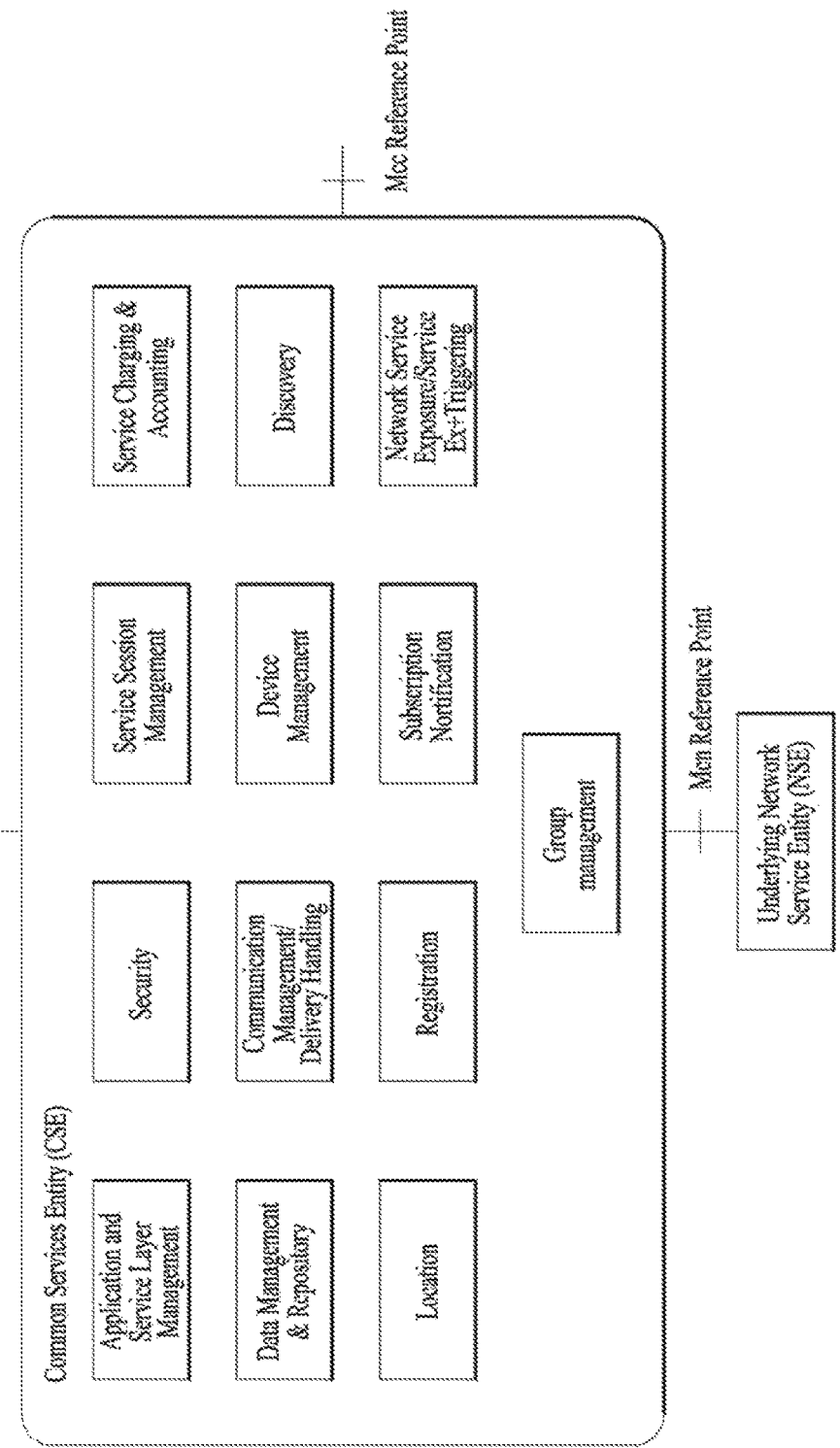
FIG. 3 illustrates a common service function provided in an M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE (or, M2M applications) may use through Mca reference point, or other CSE may use the M2M service functions through Mcc reference point. Also, the M2M service functions may be operated synchronized with underlying network (or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

The term "resource" in the M2M communication system may be used to construct and express information in the M2M communication system, and may indicate all kinds of things capable of being identified by URI. The resource may be classified into a general resource, a virtual resource, and an announced resource. Respective resources can be defined as follows.

Virtual Resource: The virtual resource may trigger specific processing, and/or may perform retrieving of the result. The virtual resource is not permanently contained in CSE.

Announced Resource: The announced resource is a resource contained in the resource CSE connected to the announced (or notified) original resource. The announced resource may maintain some parts of the characteristics of the original resource. The resource announcement may facilitate the resource searching or discovery. The announced resource contained in the remote CSE is not present as a child of the original resource in the remote CSE, or may be used to generate child resources instead of the announced child of the original resource.

General resource: If this resource is not designated as the virtual or announced resource, the corresponding resource is a general resource.

Figure 4:
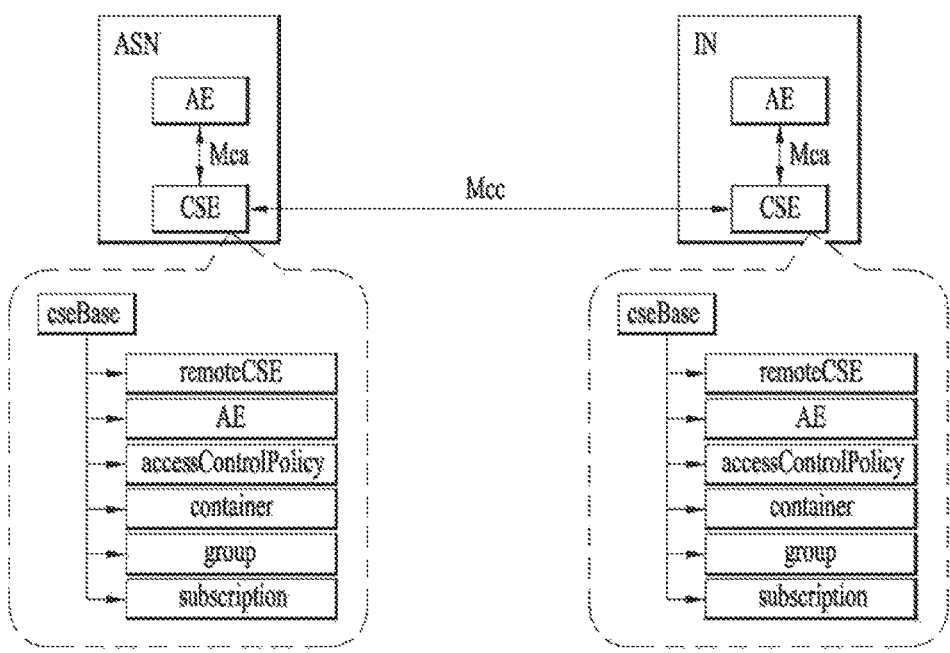
FIG. 4 illustrates a resource structure existing in an M2M application service node and an M2M infrastructure node.

FIG. 4 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of oneM2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
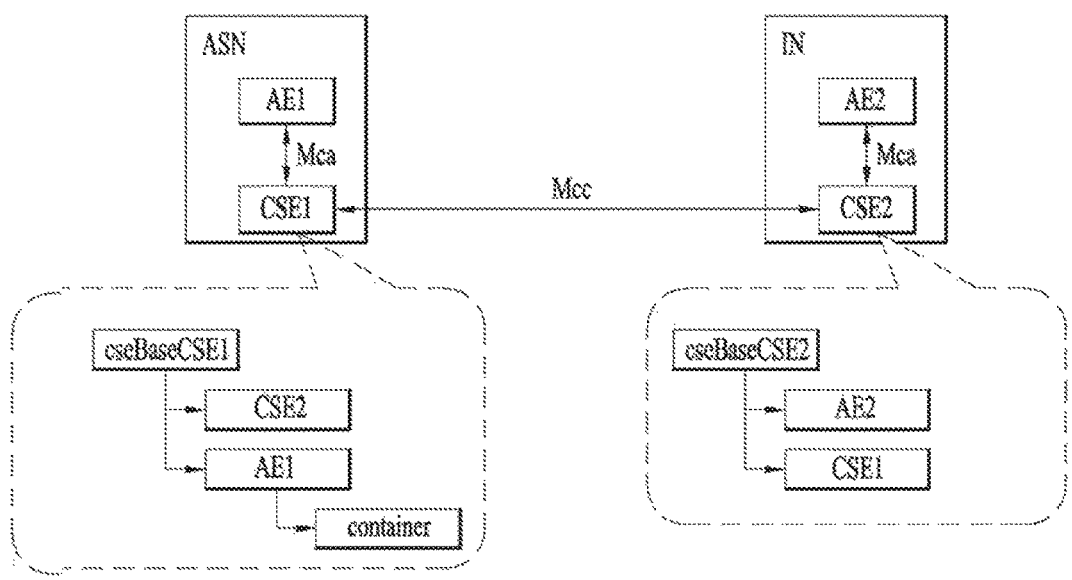
FIG. 5 illustrates a resource structure existing in an M2M application service node (for example, M2M device) and an M2M infrastructure node.

FIG. 5 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

As shown in FIG. 4 or 5, the resource for use in the M2M system may be represented by a tree structure, and the root resource type may be denoted by <CSEBase>. Therefore, the <CSEBase> resource type must be present only when the common service entity (CSE) is present.

Figure 6:
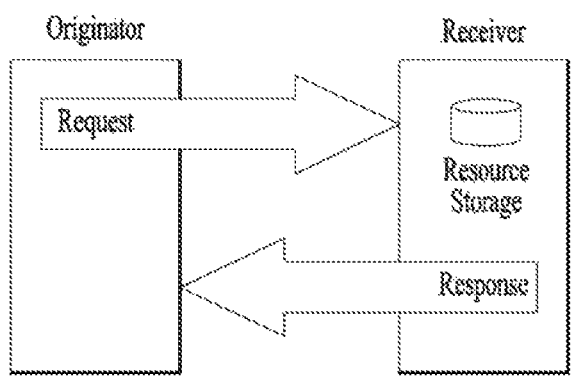
FIG. 6 illustrates a procedure of transmitting and receiving request and response messages used in an M2M communication system.

FIG. 6 is a conceptual diagram illustrating a general communication flow located at Mca and Mcc reference points. The M2M system operation is carried out on the basis of data exchanging. For example, in order to allow a first device to transmit or perform a command for stopping a specific operation of a second device, the first device must transmit the corresponding command (configured in a data form) to the second device. In the M2M system, data can be exchanged using the request and response messages during communication between the application (or CSE) and another CSE.

The request message may include the following information.

Operation: "Operation" means the shape of an operation to be carried out. (This information may be selected from among Create, Retrieve, Update, Delete, and Notify.)

To: "To" means an ID (i.e., ID of the receiver) of an entity scheduled to receive the request.

From: "From" means an ID of a calling user (i.e., call originator) who generates the request.

Request Identifier: "Request Identifier" means an ID (i.e., ID used to discriminate the request message) of the request message Content: "Content" means content of resources to be transmitted.

The response message may include the following information. If the corresponding request message is successfully processed, the response message may include the following information.

To: "To" means an ID of a calling user (i.e., a call originator) who generates the request message.

From: "From" means an ID of a called person (i.e., a call receiver) who receives the request message.

Request Identifier: "Request Identifier" means an ID of the request message used to identify the ID of the request message.

Result contents: "Result contents" means the processed result (for example, Okay, Okay and Done, Okay and in progress) of the request message.

Content: "Content" means content of resources to be transmitted (only the resultant value (rs) can be transmitted.)

If the request message processing is failed, the response message may include the following information.

To: "To" means an ID of a calling user (i.e., a call originator) who generates the request message.
From: "From" means an ID of a called person (i.e., a call receiver) who receives the request message.
Request Identifier: "Request Identifier" means an ID of the request message (so as to identify the ID of the request message).
rs: "rs" means the processed result (for example, Not Okay) of the request message.

As described above, the response message may include the above-mentioned information.

Meanwhile, various resource types shown in the following table are present.

TABLE 1

| Resource Type | Short Description | Child Resource Types | Parent Resource Types |
|---|---|---|---|
| AE | Stores information about the AE. It is created as a result of successful registration of an AE with the registrar CSE. | subscription, container, group, accessControlPolicy, mgmtObj, commCapabilities, pollingChannel | remoteCSE, CSEBase |
| cmdhNwAccessRule | Defines a rule for the usage of underlying networks. | schedule subscription | cmdhNetworkAccessRules |
| CSEBase | The structural root for all the resources that are residing on a CSE. It shall store information about the CSE itself. | remoteCSE, node, application, container, group, accessControlPolicy, subscription, mgmtObj, mgmtCmd, locationPolicy, statsConfig | None |
| group | Stores information about resources of the same type that need to be addressed as a Group. Operations addressed to a Group resource shall be executed in a bulk mode for all members belonging to the Group. | fanOutPoint subscription | Application, remoteCSE, CSEBase |
| locationPolicy | Includes information to obtain and manage geographical location. It is only referred from container, the contentInstances of the container provides location information. | subscription | CSEBase |
| remoteCSE | Represents a remote CSE for which there has been a registration procedure with the registrar CSE identified by the CSEBase resource. | application, container, group, accessControlPolicy, subscription, mgmtObj, pollingChannel, node | CSEBase |
| subscription | Subscription resource represents the subscription information related to a resource. Such a resource shall be a child resource for the subscribe-to resource. | schedule | accessControlPolicy, application, cmdhBuffer, cmdhDefaults, cmdhEcDefParamValues, cmdhDefEcValue, cmdhLimits, cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, parameters, remoteCSE, request, schedule, statsCollect, statsConfig |
| container | Shares data instances among entities. Used as a mediator that takes care of buffering the data to exchange "data" between AEs and/or CSEs. | container, contentInstance, subscription | application, container, remoteCSE, CSEBase |
| contentInstance | Represents a data instance in the container resource. | subscription | container |

Each resource type may be located below the parent resource type of the corresponding resource type, and may have a child resource type. In addition, each resource type may have attributes, and actual values may be stored in the attributes.

Table 2 shows attributes of the <container> resource type. The attributes used to store the actual values may always be set to the value of 1 through multiplicity or may be selectively set to the values ('0 . . . 1') through multiplicity. In addition, the corresponding attributes may be established according to RO (Read Only), RW (Read and Write), WO (Write Only) according to characteristics generated when the corresponding attributes are generated.

TABLE 2

| Attributes of <container> | Multiplicity | RW/RO/WO | Description |
| --- | --- | --- | --- |
| resourceType | 1 | RO | Resource Type. This Write Once (at creation time then cannot be changed) resourceType attribute identifies the type of resources. Each resource shall have a resourceType attribute. |
| resourceID | 1 | RO | This attribute is an identifier for resource that is used for 'non-hierarchical URI method' or 'IDs based method' cases. This attribute shall be provided by the Hosting CSE when it accepts a resource creation procedure. The Hosting CSE shall assign a resourceID which is unique in the CSE. |
| parentID | 1 | RO | The system shall assign the value to this attribute according to the parameters given in the CREATE Request. It establishes the parent-child relationship by identification of the parent of this child resource. Such identifier shall use the non-hierarchical URI representation. For example, an AE resource with the identifier "myAE1" which has been created under the resource ". . .//example.com/oneM2M/myCSE", the value of the parentID attribute will contain ". . . //parentID". |
| expirationTime | 1 | RW | Time/date after which the resource will be deleted by the hosting CSE. This attribute can be provided by the Originator, and in such a case it will be regarded as a hint to the hosting CSE on the lifetime of the resource. The hosting CSE can however decide on the real expirationTime. If the hosting CSE decides to change the expirationTime attribute value, this is communicated back to the Originator. The lifetime of the resource can be extended by providing a new value for this attribute in an UPDATE operation. Or by deleting the attribute value, e.g. by not providing the attribute when doing a full UPDATE, in which case the hosting CSE can decide on a new value. This attribute shall be mandatory. If the Originator does not provide a value in the CREATE operation the system shall assign an appropriate value depending on its local policies and/or M2M service subscription agreements. |
| accessControlPolicyIDs | 0 . . . 1 (L) | RW | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete, etc.). |

TABLE 2-continued

| Attributes of <container> | Multiplicity | RW/RO/WO | Description |
|---|---|---|---|
| labels | 0 . . . 1 | WR | Tokens used as keys for discovering resources.<br>This attribute is optional and if not present it means that the resource cannot be found by means of discovery procedure which uses labels as key parameter of the discovery. |
| creationTime | 1 | RO | Time/date of creation of the resource. This attribute is mandatory for all resources and the value is assigned by the system at the time when the resource is locally created. Such an attribute cannot be changed. |
| creator | 0 . . . 1 | RO | The AE-ID or CSE-ID of the entity which created the resource. |
| lastModifiedTime | 1 | RO | Last modification time/date of the resource.<br>This attribute shall be mandatory and its value is assigned automatically by the system each time that the addressed target resource is modified by means of the UPDATE operation. |
| stateTag | 1 | RO | An incremental counter of modification on the resource. When a resource is created, this counter is set to 0, and it will be incremented on every modification of the resource. The stateTag attribute of the parent resource should be incremented first and copied into this stateTag attribute when a new instance is added to the parent resource. |
| announceTo | 0 . . . 1 | RW | This attribute may be included in a CREATE or UPDATE Request in which case it contains a list of URIs/CSE-IDs which the resource being created/updated shall be announced to.<br>This attribute shall only be present on the original resource if it has been successfully announced to other CSEs. This attribute maintains the list of URIs to the successfully announced resources. Updates on this attribute will trigger new resource announcement or de-announcement. |
| announcedAttribute | 0 . . . 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed.) |
| maxNrOfInstances | 0 . . . 1 | RW | Maximum number of instances of <contentInstance> child resources. |
| maxByteSize | 0 . . . 1 | RW | Maximum number of bytes that are allocated for a <container> resource for all instances in the <container> resource. |
| maxInstanceAge | 0 . . . 1 | RW | Maximum age of the instances of <contentInstance> resources within the <container>. The value is expressed in seconds. |
| currentNrOfInstances | 1 | RO | Current number of instances in a <container> resource. It is limited by the maxNrOfInstances. |
| currentByteSize | 1 | RO | Current size in bytes of data stored in a <container> resource. It is limited by the maxNrOfBytes. |
| latest | 0 . . . 1 | RO | Reference to latest <contentInstance> resource, when present. |

TABLE 2-continued

| Attributes of <container> | Multiplicity | RW/RO/WO | Description |
|---|---|---|---|
| locationID | 0 . . . 1 | RW | URI of the resource where the attributes/policies that define how location information are obtained and managed. This attribute is defined only when the <container> resource is used for containing location information. |
| ontologyRef | 0 . . . 1 | RW | A URI of the ontology used to represent the information that is managed and understood by the AE. The ontology refers to a specification in which terms and relationship therebetween used in a domain to be handled. |

Following table defines attributes of <AE> resource.

TABLE 3

| Attributes of <AE> | Multiplicity | RW/RO/WO | Description |
|---|---|---|---|
| resourceType | 1 | RO | Refer to Table 2 |
| parentID | 1 | RO | Refer to Table 2 |
| expirationTime | 1 | RW | Refer to Table 2 |
| accessControlPolicyIDs | 0 . . . 1 (L) | RW | Refer to Table 2 |
| creationTime | 1 | RW | Refer to Table 2 |
| lastModifiedTime | 1 | RO | Refer to Table 2 |
| labels | 0 . . . 1 (L) | RO | Refer to Table 2 |
| announceTo | 0 . . . 1 | RW | Refer to Table 2 |
| announcedAttribute | 0 . . . 1 | RW | Refer to Table 2 |
| appName | 0 . . . 1 | RW | The name of the application, as declared by the application developer(e.g. "HeatingMonitoring") |
| App-ID | 1 | WO | The identifier of the Application |
| AE-ID | 1 | RO | The identifier of the Application Entity |
| pointOfAccess | 0 . . . 1 (L) | RW | The list of addresses for communicating with the registered Application Entity over Mca reference point via the transport services provided by Underlying Network (e.g. IP address, FQDN, URI). This attribute shall be accessible only by the AE and the Hosting CSE. If this information is not provided, the AE should use <pollingChannel> resource. Then the Hosting CSE can forward a request to the AE without using the PoA. |
| ontologyRef | 0 . . . 1 | RW | Refer to Table 2 |
| nodeLink | 0 . . . 1 | RO | A URI of a <node> resource that stores the node specific information. |

Resource Access Control Policy

An access control policy is defined as a "white list" or privileges and each privilege defines "allowed" entities for certain access modes. Sets of privileges are handled such that the resulting privileges for a group of privileges are the sum of the individual privileges; i.e., an action is permitted if the action is permitted by some/any privilege in the set. A selfPrivilege attribute lists entities authorized for Read/Update/Delete of <accessControlPolicy> resource.

All privileges defined by the access control policy are associated with positions, time windows and IP addresses.

Privileges for accessing a resource are defined by privileges defined in <accessControlPolicy> resource by setting an accessControlPolicyID attribute on the resource.

Figure 7:
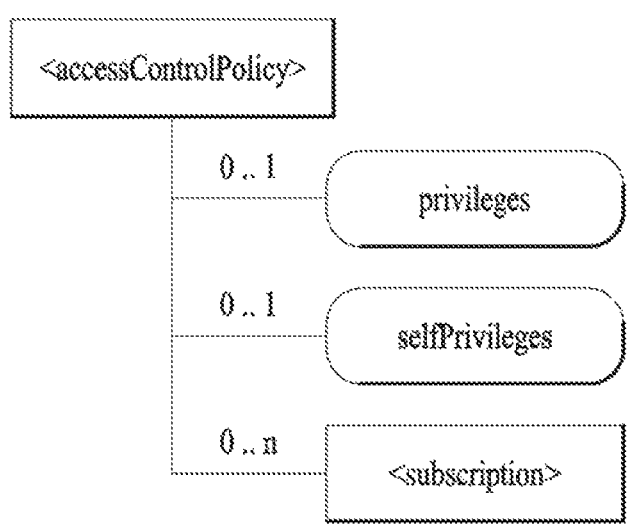
FIG. 7 illustrates a structure of <accessControlPolicy> resource.

FIG. 7 illustrates a structure of the <accessControlPolicy> resource. The following table shows attributes of the <accessControlPolicy> resource.

TABLE 4

| Attribute Name of <accessControlPolicy> | Multiplicity | RW/RO/WO | Description |
|---|---|---|---|
| resourceType (rT) | 1 | RO | Refer to Table 2 |
| parentID (pID) | 1 | RO | Refer to Table 2 |
| expirationTime (eT) | 1 | RW | Refer to Table 2 |

TABLE 4-continued

| Attribute Name of <accessControlPolicy> | Multiplicity | RW/RO/WO | Description |
|---|---|---|---|
| labels (lBs) | 0 . . . 1 | RW | Refer to Table 2 |
| creationTime (cT) | 1 | RO | Refer to Table 2 |
| lastModifiedTime (lMT) | 1 | RO | Refer to Table 2 |
| Link | 1 | WO | This attribute shall be present only on the announced resource. This attribute shall provide the link (URI) to the original resource. This is only for <accessControlPolicyAnnc>. |
| announceTo | 1 | RW | Refer to Table 2 |
| announcedAttribute | 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| privileges (ps) | 1 | RW | The list of privileges defined by this <accessControlPolicy> resource. These privileges are applied to resources referencing this <accessControlPolicy> resource using the accessControlPolicyID attribute. |
| selfPrivileges (sP) | 1 | RW | Defines the list of privileges for the <accessControlPolicy> resource itself. |

Privileges can be generalized to actions (which may be granting access, but may also be more specific, granting access, i.e. filtering part of data). While the privileges can be generalized to conditions, which may include the identifier of a requestor, except specified identifiers, but the privileges may also include time based conditions.

An access authentication mechanism based on the access control policy operates by matching a requester to the privilege of the requester, stored in the <accessControlPolicy> resource. Upon discovery of positive matching, a requested operation (e.g. RETRIEVE) is checked using a set of allowed operations associated with a matching privilege owner. If the check fails, the request is rejected. Such set is referred to as a privilege flag.

Self-privileges and privileges are lists of requester privileges associated with the <accessControlPolicy> resource itself and privilege flags applied to the <accessControlPolicy> resource and all other resource types which address accessControlPolicyID common attribute.

All privileges defined in the access control policy are associated with positions, time windows and IP addresses prior to access authentication.

Each privilege of the self-privileges and privileges can be configured as a role. Such role is identified by a role name and a URL that addresses an M2M service subscription resource in which the role is defined. When a requester represents itself with a specific role, the access control policy operates by matching the requester with lists, which belong to a specific role specified in the M2M service subscription resource.

Each privilege in the privilege and self-privilege lists includes the following elements.

TABLE 5

| Name | Description |
|---|---|
| originatorPrivileges | Refer to Table 6 |
| Contexts | Refer to Table 7 |
| operationFlags | Refer to Table 8 |

"originatorPrivileges" includes information shown in the following table.

TABLE 6

| Name | Description |
|---|---|
| Domain | FQDN domain |
| Originator identifier | CSE ID or AE ID which represent a originator identity |
| Token | Access token usually provided as query parameter |
| All | All originators |
| Role | A role name associated with the URL the a Service Subscription resource where such role is defined |

"contexts" in Table 5 includes information shown in the following table.

TABLE 7

| Name | Description |
|---|---|
| Context | Defines the context in which every privileges of the present access control policy resource applies, e.g. time windows, location, and IP address. |

"operationFlags" in Table 5 includes information shown in the following table.

TABLE 8

| Name | Description |
| --- | --- |
| RETRIEVE | Privilege to retrieve the content of an addressed resource |
| CREATE | Privilege to create a child resource |
| UPDATE | Privilege to update the content of an addressed resource |
| DELETE | Privilege to delete an addressed resource |
| DISCOVER | Privilege to discover the resource |
| NOTIFY | Privilege to receive a notification |

In an M2M communication system, an access control policy resource is stored separately from a resource to which the corresponding access control policy has been applied. The resource to which the access control policy has been applied has only AccessRightID (URI of the access control policy resource) of the access control policy resource. Accordingly, if an M2M entity wants to check an access control policy of a specific resource, the M2M entity needs to refer to AccessRightID.

Entity Registration

An M2M entity finishes preparation for using systems/services by registering with neighboring entities irrespective of whether the M2M entity is located in the field domain or infrastructure domain. Such registration is performed at the request of a registree and information on the registree is stored in a registrar as a registration result.

After registration, oneM2M entities can use M2M services using common functions provided by a CSE, as illustrated in FIG. 3.

oneM2M entities include an AE and a CSE and thus registration may be divided into AE registration and CSE registration. Here, both the AE and CSE refer to registrees and the CSE corresponds to a registrar. In the case of CSE registration, information on the registrar CSE is additionally stored in the registree CSE.

Figure 8:
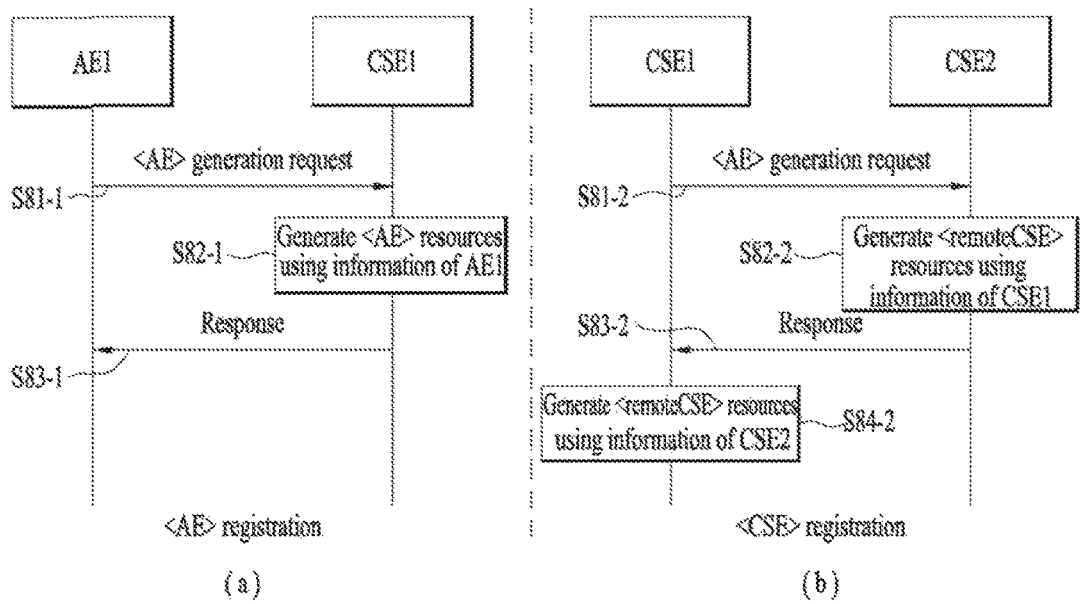
FIG. 8 illustrates a registration procedure in an M2M communication system.

FIG. 8 illustrates an AE registration procedure and a CSE registration procedure. FIG. 8(a) shows the AE registration procedure. AE1 that intends to perform registration sends a request for generation of <AE> resources to CSE1 corresponding to a registrar (S81-1). CSE1 can generate the <AE> resources using information of AE1 (S82-1). Then, CSE1 can send a response including a result of registration to AE1 (S83-1).

FIG. 8(b) illustrates the CSE registration procedure. The procedure of FIG. 8(b) corresponds to the procedure of FIG. 8(a) except that CSE1 corresponds to a registree, CSE2 corresponds to a registrar, and when CSE2 sends a result for a registration request of CSE1 (S83-2), CSE1 generates <remoteCSE> resources using information of CSE2 (S84-2).

The M2M common service layer provides subscription/notification functionality to applications. This allows data to be exchanged between the CSE and the AEs through different CSE repositories. The subscription/notification operates basically as shown in FIG. Entity 2 wants to receive information about a particular event of entity 1 (e.g., changing a particular resource value of entity 1). To this end, entity 2 may create or set a subscription to entity 1 for the particular event (S910) and receive a response to it (S920). When the specific event occurs and the notification according to the subscription is triggered, the entity 1 can notify the entity 2 of the notification (S930).

Figure 9:
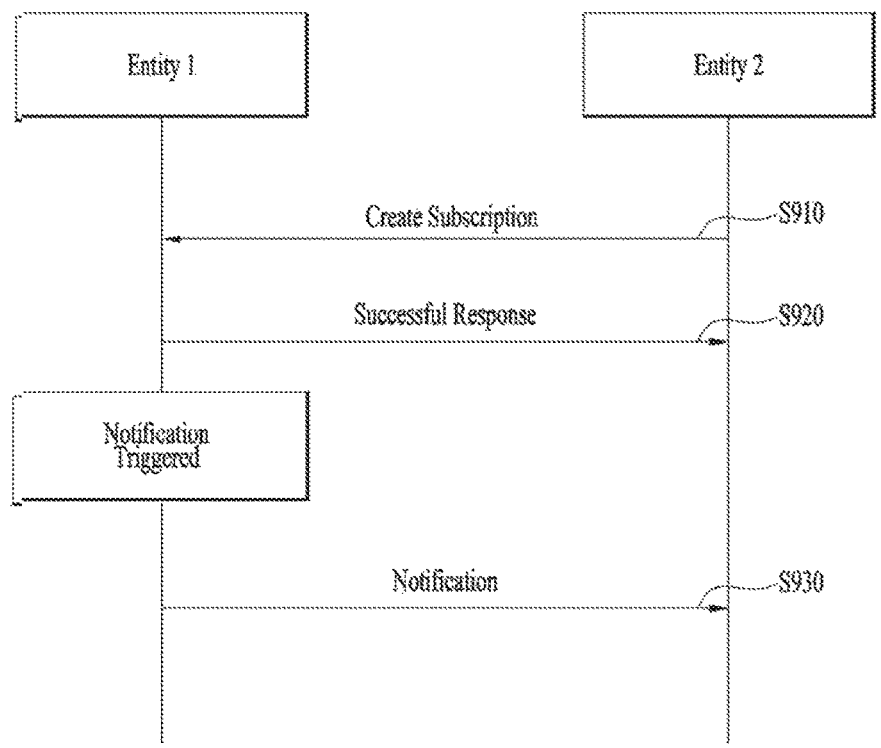
FIG. 9 illustrates an operation related to a subscription service.
Figure 10:
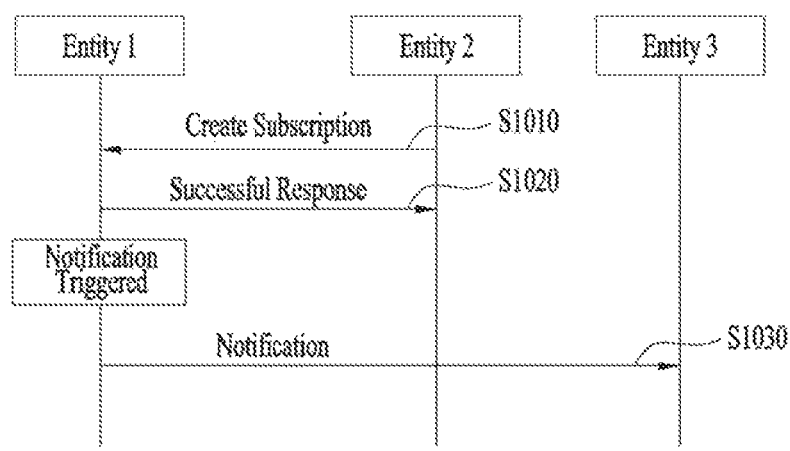
FIG. 10 illustrates an operation related to a subscription service.

FIG. 10 shows a case where three entities participate in subscription/notification. Entity 2 does not necessarily have to receive notification of its own subscription. An example is the case where one entity creates a subscription for many different entities in an M2M environment. Therefore, in the following circumstances, the entity that created the subscription may differ from the entity that actually receives the notification. That is, unlike FIG. 9, the entity 2 creates or sets a subscription (S1010), but the notification according to the subscription may be delivered to the entity 3 (S1030).

The subscription in FIGS. 9 and 10 is created or configured in Entity 1 in the form of the subscription resource (<subscription>) described above.

In this specification, a method for simultaneously transmitting data from a specified IoT device to a plurality of random unspecified IoT devices located in the vicinity of the specified IoT device and receiving broadcast data in accordance with a type of a receiver will be described.

Figure 11:
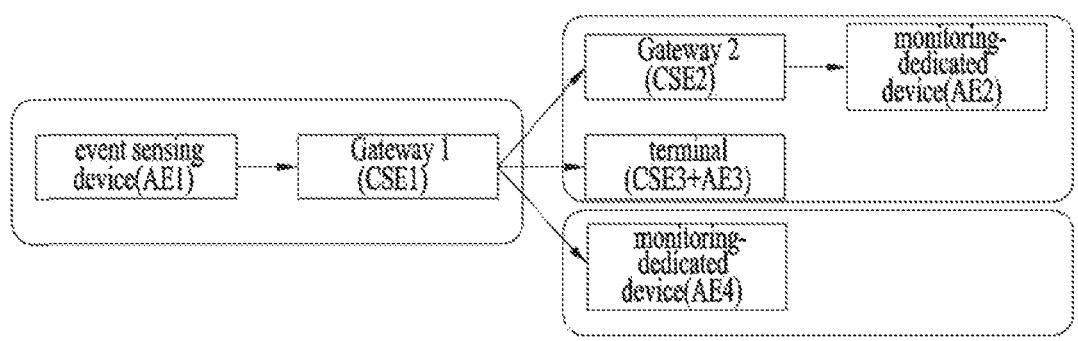
FIG. 11 illustrates a system configuration to which the present invention is applied.

FIG. 11 illustrates a system configuration to which the present invention is applied. When a specified event occurs in an event sensing device, information related to the specified event may be updated in GateWay1 which is previously registered, and a platform of the GateWay1 may transmit the above information to the periphery as a broadcast function. The number of cases that the information may be received may be considered by three cases as follows.

Case that the information received by the platform is transferred to a remote application (inaccessible distance or impossible support of corresponding communication function)

Figure 12:
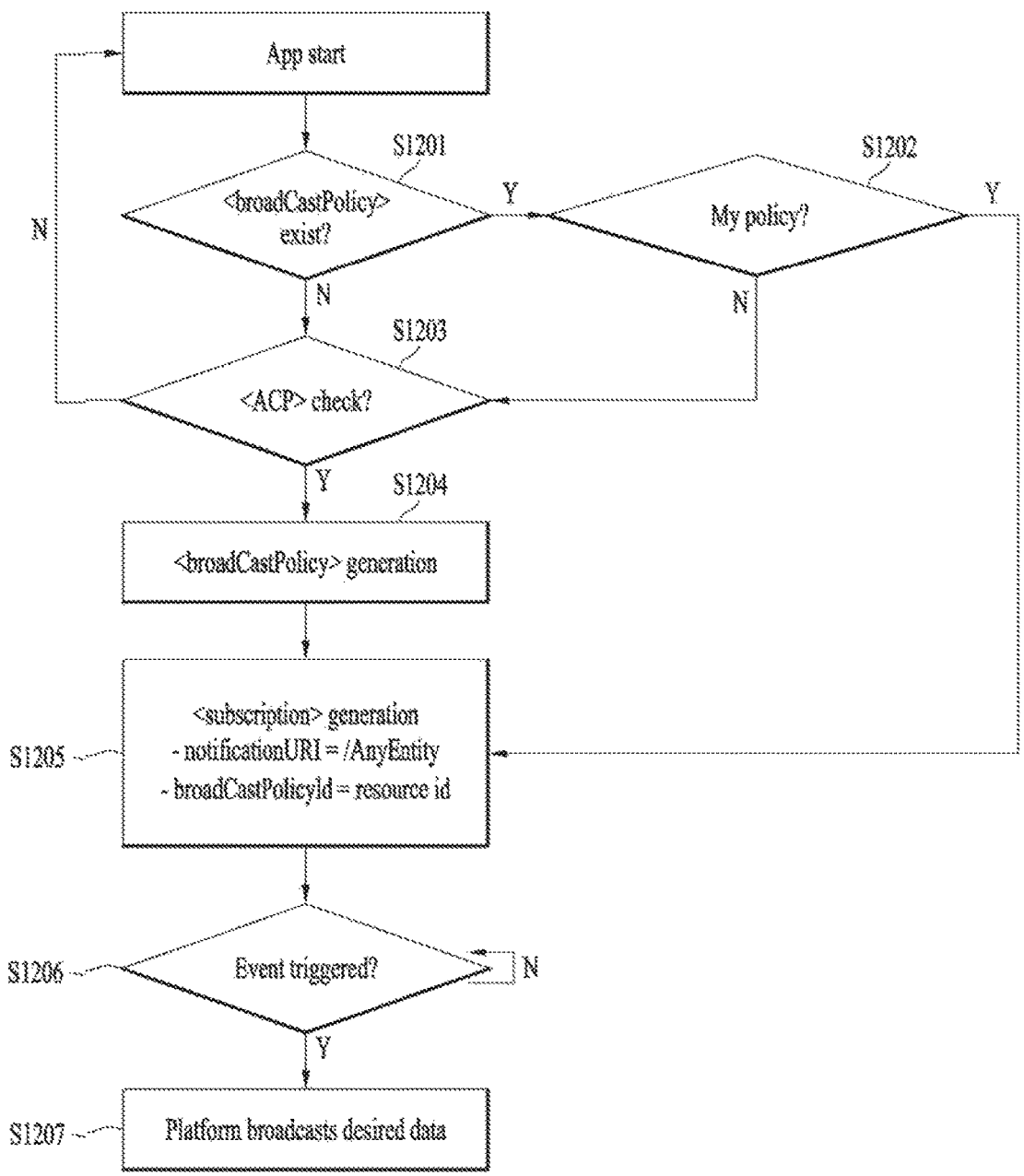
FIG. 12 illustrates a procedure of transmitting a broadcast message according to one embodiment of the present invention.

Case that the information received by the platform is transferred to an application located at the same node Case that the information received by the platform is directly received by a remote application irrespective of the platform Method for Transmitting Broadcast Message FIG. 12 illustrates a procedure of transmitting a broadcast message according to one embodiment of the present invention.

To enable broadcast message transmission suggested in this specification, new resources and attributes correction and addition are required.

Figure 13:
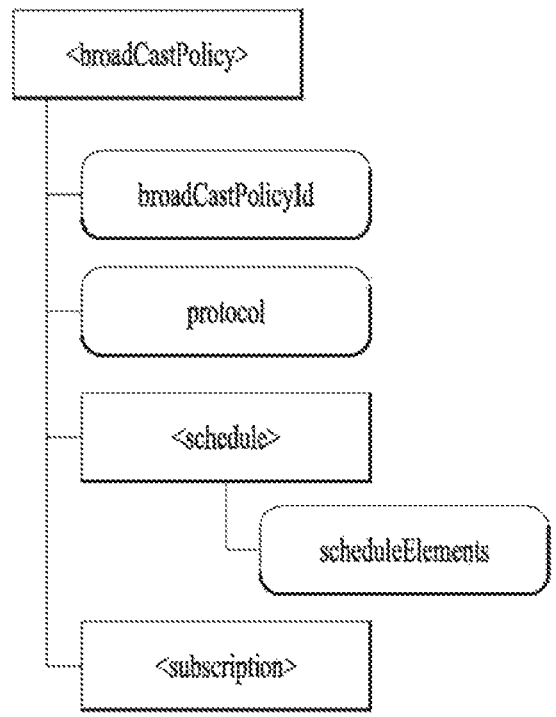
FIG. 13 illustrates a resource and its structure according to one embodiment of the present invention.

A new resource <broadCastPolicy> is shown in FIG. 13. The new resource <broadCastPolicy> includes a policy applied when the platform performs a broadcast operation. Unique attributes and lower resources included in the new resource are as follows.

broadCastPolicyId: identifier of the corresponding <broadCastPolicy>.

protocol: specifies a protocol which will be used, among various underlying Networks for supporting broadcasting.

<schedule>: specifies a transmission cycle and end timing of a broadcast message.

The broadcast policy is paged and used if a notificationTargetURI attribute of <subscription> resource related to a monitoring target resource or attribute is set to a specified keyword (for example, "/AnyEntity"). Also, since a plurality of <broadCastPolicy> resources may exist, information for specifying a resource, which will be used, is required, whereby a new attribute called broadCastPolicyId is suggested.

If eventNotificationCriteria of a specified <subscription> is satisfied, the platform may transmit the broadcast message with reference to a broadcast policy resource indicated by broadCastPolicyId referred to by, indicated by or included in the corresponding <subscription> if notificationTargetURI is set to a specific keyword, for example, "/AnyEntity".

In order that a specified application (for example, event sensing device AE1 of FIG. 11) requests the platform (for example, Gateway1 (CSE 1) of FIG. 11) to transmit the broadcast message based on the specified event, the <broadCastPolicy> resource should be generated in the platform. Therefore, if the application starts, the <broadCastPolicy> resource should be generated.

The application may identify whether the previously generated <broadCastPolicy> exists in the platform, through resource type retrieval to avoid generation and definition of a repeated resource (S1201).

If the <broadCastPolicy> resource exists, the application may determine whether a protocol and schedule of the corresponding <broadCastPolicy> resource are the same as a desired policy (S1202). If the <broadCastPolicy> resource is desired by the application, the application may use the <broadCastPolicy> resource without generating a new resource. At this time, the operation of the application continues to be performed by S1205.

If the <broadCastPolicy> resource is not desired by the application, the application continues to perform a procedure of generating <broadCastPolicy> resource matched with its desired broadcast policy.

Meanwhile, if the <broadCastPolicy> resource does not exist in S1201, the application continues to perform a procedure of generating <broadCastPolicy> resource matched with its desired broadcast policy.

Since the application should have a proper authority for generating <broadCastPolicy> resource, a procedure of identifying the authority through <accessControlPolicy> resource may be performed (S1204). The application may request the platform to which the application is previously registered, to generate the <broadCastPolicy> resource, and the platform, which has received the corresponding request, may perform a procedure of identifying the authority for the request of the application.

If the application does not have the authority for generating the <broadCastPolicy> resource, the platform transfers information indicating that the application has no authority, to the application, and the procedure shown in FIG. 12 ends.

If the application has the authority for generating the <broadCastPolicy> resource, the platform may generate a new <broadCastPolicy> resource, and may set and generate a mandatory/optional attribute and a child resource (S1204). At this time, if the <subscription> resource is used, the application may be informed of notification for a change of the <broadCastPolicy> resource.

After the <broadCastPolicy> resource is generated, the application may perform a request of generating <subscription> resource at a lower level than a related resource and setting a proper attribute to monitor a resource or attribute desired to be broadcasted when an event occurs (S1205). For example, eventNotificationCriteria="if updated", notificationTargetURI=/AnyEntity, broadCastPolicyId=resourceId of <broadCastPolicy>. Since an authority is required in generating the <subscription> resource and setting the attribute in S1205, if a related resource for monitoring is stored in another entity (for example, the platform) not the application, the application may transmit the above request to a corresponding entity who stores or has the related resource. Then, the corresponding entity may determine whether the <subscription> resource should be generated and the attribute should be set, by checking if the application has the authority. Also, generation of the <subscription> resource is performed by the procedure described in FIGS. 9 and 10.

In the legacy oneM2M system, although a notification receiving address (notificationTargetURI) is required to be specified in notificationTargetURI attribute, a method for setting the corresponding attribute to a specified keyword (for example, "/AnyEntity") is suggested to allow the platform to recognize the corresponding attribute as a transmission request of the broadcast message. For reference, when an oneM2M message is transmitted, "To" parameter is set to notificationTargetURI, and a receiving side receives the corresponding message by determining whether the "To" parameter indicates the receiving side.

In accordance with the legacy <subscription> resource related mechanism, the platform may monitor whether an event, which satisfies eventNotificationCriteria, occurs (S1206). When the corresponding event occurs, the platform may transmit the corresponding data, that is, the broadcast message in accordance with the policy (protocol, schedule) of the <broadCastPolicy> resource linked by broadCastPolicyId (S1207).

In accordance with the aforementioned method, the corresponding data may be transmitted to an entity which is previously registered or an entity which does not know specified URI, through a broadcasting scheme.

If the broadcast message is transmitted by the method described with reference to FIG. 12, all nodes which are within a range of communication services and support a corresponding underlyingNetwork may receive the broadcast message. However, there may exist the number of two cases that the application may directly receive the broadcast message in view of a structure of the nodes and that the platform receives the broadcast message and transfers the received broadcast message to the application. Therefore, it is required that each method should be defined separately.

The case that the platform receives the broadcast message and transfers the received broadcast message to the application will be described.

Figure 14:
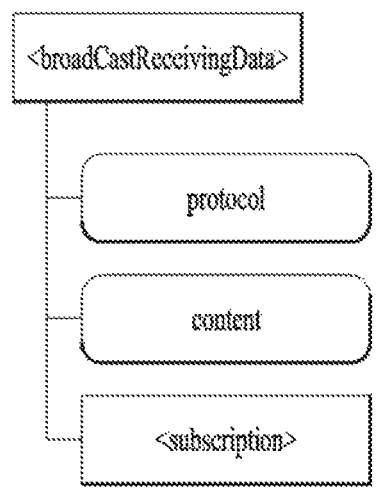
FIG. 14 illustrates a resource and its structure according to one embodiment of the present invention.

The application may be located at the same node as the platform or may exist on an external independent node. The receiving method is equally applied to these two cases. In case of reception of general data not broadcasting, the "To" parameter of the message received in the platform always includes a target address (URI) of the corresponding message. The platform, which has received the message, physically transfers the message by identifying a Point of Access (PoA) of a target entity registered therein. However, as described above, since the "To" parameter of the message received through broadcasting is set to a specific keyword, there is no target address, whereby a problem occurs in that there is no method for transferring the corresponding message to the application. To solve this problem, a new resource shown in FIG. 14 is required. Hereinafter, a method for using the new resource shown in FIG. 14 will be suggested.

The application at the receiving side, which desires to receive the broadcast message, should previously generate a <broadCastReceivingData> resource for receiving the broadcast message in the platform in which the application is registered. If the "To" parameter of the received message is set to a specified keyword, the platform may recognize the parameter as the broadcast message and store all messages received through broadcasting in a content attribute of the <broadCastReceivingData> resource. Also, the platform may identify a protocol in which the broadcast message is received, among various network protocols that may be supported by a node where the platform is located, and may store the corresponding network protocol information in a protocol attribute. Therefore, after the <broadCastReceivingData> resource is generated in the platform, the application at the receiving side may receive a related message by generating the <subscription> resource including a desired condition at a lower level than the <broadCastReceivingData> resource.

Figure 15:
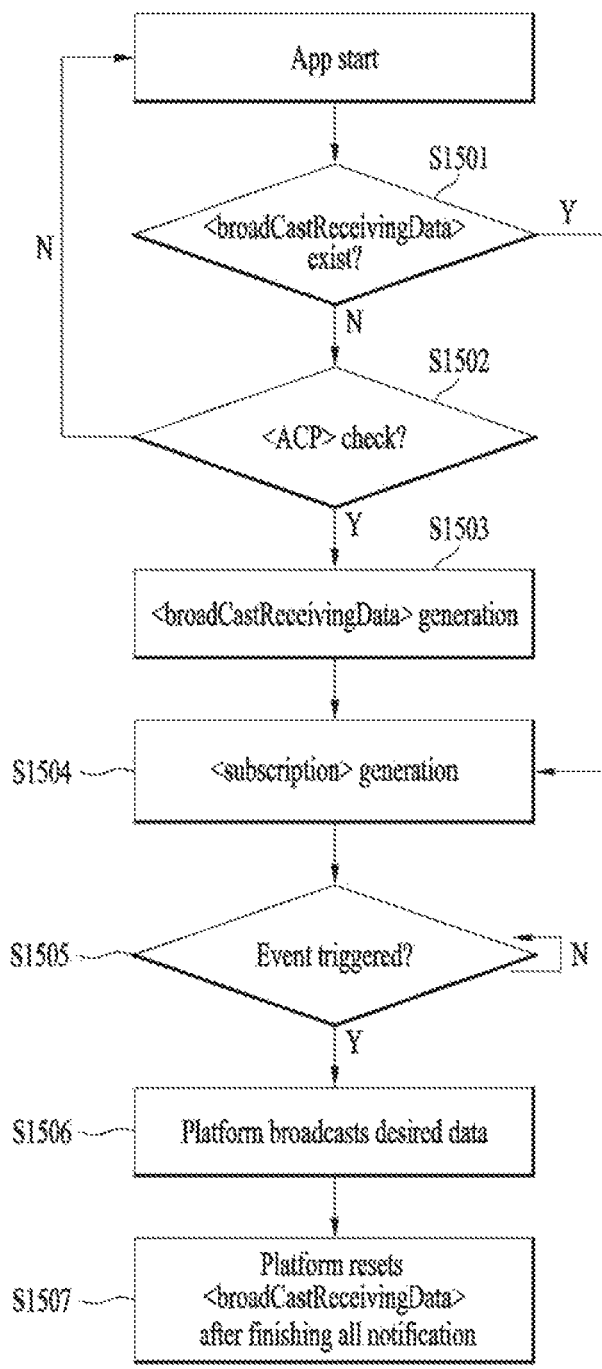
FIG. 15 illustrates a procedure of receiving a broadcast message according to one embodiment of the present invention.

FIG. 15 illustrates a procedure of receiving a broadcast message according to one embodiment of the present invention.

An application, which desires to receive a broadcast message through a platform, should request the platform to generate a <broadCastReceivingData> resource. Prior to this request, the application may identify whether there is the same <broadCastReceivingData> resource, through resourceType retrieval to avoid definition and generation of a repeated resource (S1501).

If there is no the same <broadCastReceivingData> resource, the application may request the platform to generate the <broadCastReceivingData> resource. The platform stops the procedure if there is no authority after identifying the authority using <accessControlPolicy> resource (S1502).

If it is determined that there is the same <broadCastReceivingData> resource at step S1501, the application continues to perform a later procedure without generating the repeated resource.

If the application has an authority for requesting generation of the <broadCastReceivingData> resource, the platform may generate the <broadCastReceivingData> resource (S1503).

The application may generate a <subscription> in the <broadCastReceivingData> resource to receive the broadcast message. In more detail, the application may request the platform to generate the <subscription> resource at a lower level than the <broadCastReceivingData> resource. If a broadcast message, which satisfies a desired condition (protocol desired to be received), the <subscription> resource may be set such that the broadcast message may be transferred to the application.

Since an authority is required to actually generate the <subscription> resource at step S1504, the platform, which has received the request of generation of the <subscription> resource, may determine whether the <subscription> resource has been generated, by identifying the authority.

Afterwards, the platform may monitor whether an event set in the <subscription> resource of the <broadCastReceivingData> resource is triggered (S1505).

If the event is triggered, that is, if a "To" parameter of the received message is a previously defined keyword and a network protocol used for transmission is matched with a network protocol desired by a receiving application, the platform may transfer the broadcast message to an application of an address set in the <subscription> resource (S1506).

If all operations related to the <subscription> resource for the received broadcast message are completed, the platform may delete a current value of an attribute of the <broadCastReceivingData> and may be ready for receiving next message to prevent another application from wrongly transmitting the past data (S1507).

The case that the application directly receives the broadcast message without passing through the platform will be described.

The method for directly receiving the broadcast message in the application without passing through the platform is simple. If a "To" parameter value of a notification message (that is, notification request) is set to a specific keyword ("/AnyEntity") that means or intends the broadcast message, the application may receive and process this value. At this time, after receiving the broadcast message, the application does not transmit a response message.

Figure 16:
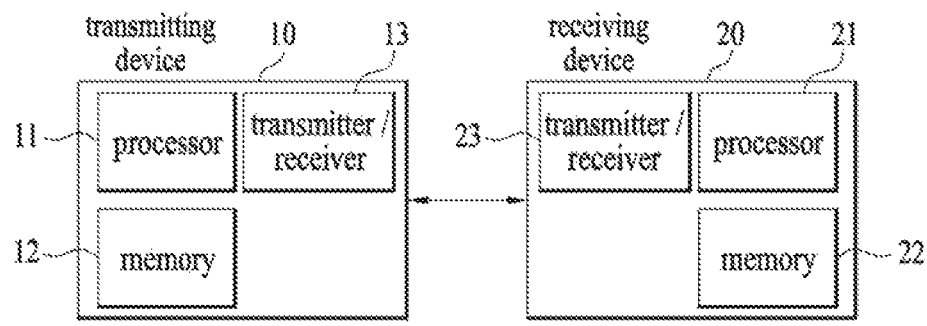
FIG. 16 is a block diagram illustrating a device configured to perform the embodiment(s) of the present invention.

FIG. 16 is a block diagram of a transmitting device 10 and a receiving device 20 configured to implement exemplary embodiments of the present invention. Referring to FIG. 16, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the scope of the invention described in the appended claims. Accordingly, the invention should not be limited to the specific embodiments described herein, but should be accorded the broadest scope consistent with the principles and novel features disclosed herein.

What is claimed is:

1. A method for transferring a broadcast message to an unspecified entity in a wireless communication system, the method performed by a device for transferring a broadcast message and comprising:
    creating a resource for receiving the broadcast message in accordance with a request, received from an application device, for creating the resource for receiving the broadcast message;

storing a content of the broadcast message in a specified attribute of the created resource if the broadcast message is received; and if an event trigger condition of a subscription resource for the created resource is satisfied, transmitting a notification message, which includes the stored content of the broadcast message, to an address or a device indicated by a notification target attribute of the subscription resource.

2. The method according to claim 1, further comprising:
receiving a request for creating the subscription resource for the created resource from the application device; and creating the subscription resource in accordance with the request.

3. The method according to claim 1, wherein the broadcast message includes information indicating a receiver of the broadcast message which is set as a predetermined keyword.

4. The method according to claim 1, wherein the created resource includes a first attribute for storing the content of the received broadcast message and a second attribute for storing information on a network protocol through which the broadcast message is received.

5. The method according to claim 1, further comprising deleting the stored content of the broadcast message if the notification message is transferred.

6. A device configured to transfer a broadcast message to an unspecified entity in a wireless communication system, the device comprising:
a transmitter;
a receiver; and
a processor configured to control the transmitter and the receiver,
wherein the processor is configured to:
create a resource for receiving the broadcast message in accordance with a request, received from an application device, for creating the resource for receiving the broadcast message,
store a content of the broadcast message in a specified attribute of the created resource if the broadcast message is received, and
if an event trigger condition of a subscription resource for the created resource is satisfied, transmit a notification message, which includes the stored content of the broadcast message, to an address or a device indicated by a notification target attribute of the subscription resource.

7. The device according to claim 6, wherein the processor is configured to receive a request for creating the subscription resource for the created resource from the application device and create the subscription resource in accordance with the request.

8. The device according to claim 6, wherein the broadcast message includes information indicating a receiver of the broadcast message which is set as a predetermined keyword.

9. The device according to claim 6, wherein the created resource includes a first attribute for storing the content of the received broadcast message and a second attribute for storing information on a network protocol through which the broadcast message is received.

10. The device according to claim 6, wherein the processor is configured to delete the stored content of the broadcast message if the notification message is transferred.

* * * * *